(12) United States Patent
Lavallee et al.

(10) Patent No.: US 12,522,722 B2
(45) Date of Patent: Jan. 13, 2026

(54) COMPOSITIONS WITH HYPERBRANCHED POLYESTER POLYOL POLYMER PROCESSING ADDITIVES

(71) Applicant: 3M INNOVATIVE PROPERTIES COMPANY, St. Paul, MN (US)

(72) Inventors: Claude Lavallee, Roseville, MN (US); Chetan P. Jariwala, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/881,873

(22) PCT Filed: May 23, 2023

(86) PCT No.: PCT/IB2023/055314
§ 371 (c)(1),
(2) Date: Jan. 7, 2025

(87) PCT Pub. No.: WO2024/033713
PCT Pub. Date: Feb. 15, 2024

(65) Prior Publication Data
US 2025/0257199 A1    Aug. 14, 2025

Related U.S. Application Data

(60) Provisional application No. 63/371,301, filed on Aug. 12, 2022.

(51) Int. Cl.
*C08L 23/06* (2006.01)
*C08J 3/22* (2006.01)
*C08J 5/18* (2006.01)

(52) U.S. Cl.
CPC .............. *C08L 23/06* (2013.01); *C08J 3/226* (2013.01); *C08J 5/18* (2013.01); *C08J 2323/06* (2013.01);
(Continued)

(58) Field of Classification Search
None
See application file for complete search history.

(56) References Cited

U.S. PATENT DOCUMENTS

| 5,663,247 A | 9/1997 | Sorensen et al. |
| 6,300,424 B1 | 10/2001 | Frechet et al. |

(Continued)

FOREIGN PATENT DOCUMENTS

| CN | 103613847 A | 3/2014 |
| EP | 1424360 A1 | 6/2004 |

(Continued)

OTHER PUBLICATIONS

Hong, "A novel processing aid for polymer extrusion: Rheology and processing of polyethylene and hyperbranched polymer blends", Journal of Rheology, 1999, vol. 43, No. 3, pp. 781-793.

(Continued)

*Primary Examiner* — Arrie L Reuther
*Assistant Examiner* — Devin Mitchell Darling
(74) *Attorney, Agent, or Firm* — Jeffrey M. Olofson (57) ABSTRACT

Hyperbranched polyester polyols having 40 to 60% linear carbons, based on the total number of linear, dendritic, and terminal carbons are used as polymer processing additives. Compositions containing a thermoplastic polymer and such polymer processing additives, as well as methods of extruding thermoplastic polymers containing such polymer processing additive compositions are described. The additional use of synergists selected from the group consisting of polyethylene glycols, polyethylene oxides, polycaprolactones and combinations thereof are also described.

6 Claims, 3 Drawing Sheets

(52) U.S. Cl.
CPC ........ *C08J 2467/04* (2013.01); *C08J 2471/02* (2013.01); *C08L 2203/16* (2013.01); *C08L 2203/30* (2013.01); *C08L 2205/03* (2013.01); *C08L 2205/06* (2013.01); *C08L 2207/066* (2013.01); *C08L 2310/00* (2013.01)

(56) References Cited

U.S. PATENT DOCUMENTS

| | | |
|---|---|---|
| 6,818,695 B2 | 11/2004 | Dillon et al. |
| 7,001,951 B2 | 2/2006 | Chapman, Jr. |
| 9,328,239 B2 | 5/2016 | Krishnaswamy |
| 9,896,575 B2 | 2/2018 | Duchesne et al. |
| 2003/0220450 A1* | 11/2003 | Dillon ................ C08L 101/005 525/191 |
| 2011/0152457 A1 | 6/2011 | Peacock et al. |
| 2014/0213712 A1* | 7/2014 | Bolourchi ............... C08L 51/06 524/437 |

FOREIGN PATENT DOCUMENTS

| | | |
|---|---|---|
| WO | 199612754 A1 | 5/1996 |
| WO | 200179352 A1 | 10/2001 |
| WO | 2003078526 A1 | 9/2003 |
| WO | 2013036573 A2 | 3/2013 |
| WO | 2023089434 A1 | 5/2023 |

OTHER PUBLICATIONS

Hong, "Film blowing of linear low-density polyethylene blended with a novel hyperbranched polymer processing aid", Polymer, 2000, vol. 41, No. 21, pp. 7705-7713.

International Search Report for PCT International Application No. PCT/IB2023/055314, mailed on Sep. 18, 2023, 4 pages.

Jang, "Crystallization Behavior of Poly(ethylene terephthalate) Blended with Hyperbranched Polymers: The Effect of Terminal Groups and Composition of Hyperbranched Polymers", Macromolecules 2000, vol. 33, No. 5, pp. 1864-1870.

* cited by examiner

COMPOSITIONS WITH HYPERBRANCHED POLYESTER POLYOL POLYMER PROCESSING ADDITIVES

CROSS REFERENCE TO RELATED APPLICATIONS

This application is a national stage filing under 35 U.S.C. 371 of PCT/IB2023/055314, filed May 23, 2023, which claims the benefit of U.S. Application No. 63/371,301, filed Aug. 12, 2022, the disclosure of which is incorporated by reference in its/their entirety herein.

FIELD

The present disclosure relates to hyperbranched polyester polyol polymer processing additives and thermoplastic polymer compositions containing them.

SUMMARY

Briefly, in one aspect, the present disclosure provides compositions comprising a major amount of a thermoplastic polymer and a hyperbranched polyester polyol polymer processing additive. The hyperbranched polyester polyol has 40 to 60% linear carbons, based on the total number of linear, dendritic, and terminal carbons. In some cases, the composition also comprises a synergist, e.g., polyethylene glycols, polyethylene oxides, polycaprolactones and combinations thereof.

In another aspect, the present disclosure provides methods for forming a film comprising blending a thermoplastic polymer with a hyperbranched polyester polyol and, optionally, a synergist to form a composition, and extruding the composition.

DETAILED DESCRIPTION

The extrusion of polymeric materials in the formation and shaping of articles is a major segment of the plastic or polymeric articles industry. The quality of the extruded article and the overall success of the extrusion process are influenced by the interaction of the fluid material with the extrusion die. The desire for a smooth extrudate surface competes with, and must be optimized with respect to, the economic advantages of extruding a polymer composition at the fastest possible speed (for example at high shear rates).

For any melt-processable thermoplastic polymer composition, there exists a critical shear rate above which the surface of the extrudate becomes rough or distorted and below which the extrudate will be smooth. At shear rates slightly above the critical shear rate, defects in extruded thermoplastics may take the form of "sharkskin" which is a loss of surface gloss that, in more serious manifestations, appears as ridges running more or less transverse to the extrusion direction. At higher shear rates, the extrudate can undergo "continuous melt fracture" becoming grossly distorted. At rates lower than those at which continuous melt fracture is first observed, certain thermoplastics can also suffer from "cyclic melt fracture" in which the extrudate surface varies from smooth to rough.

Other problems encountered during extrusion of thermoplastic polymers include build-up of the polymer at the orifice of the die (known as die build up or die drool), high back pressure during extrusion runs, and excessive degradation or low melt strength of the polymer due to the need to use higher extrusion temperatures to overcome these issues. These problems slow the extrusion process either because the process must be stopped to clean the equipment or because the process must be run at a lower speed.

Additives for polymer processing (also referred to as "polymer processing additives" or "PPA") have been used to address such problems. PPAs can reduce melt stagnation at the die and increase the shear rates at which thermoplastic polymers are extruded without visible melt defects.

Hyperbranched polymers are known in the art. Hyperbranched polymers are similar to dendrimers in that both are characterized by a highly branched 3-dimensional structure. All bonds emanate from a core, with a branch juncture at each monomer unit and a multiplicity of reactive chain ends. A branching generation is composed of structural units which are bound radially to the core or to the structural units of a previous generation and which extend outwards. The structural units have at least two monofunctional groups and/or at least one monofunctional group and one multifunctional group. The term multifunctional is understood as having a functionality of 2 or higher. To each functionality, a new structural unit may be linked, a higher branching generation being produced as a result. Unlike dendrimers, hyperbranched polymers have an irregular structure and positioning of their functional groups; thus, while dendrimers are described as having precise "generations," hyperbranched polymers are described as having "pseudo-generations." The resulting hyperbranched polymers have a core, at least one branching pseudo-generation and an external surface composed of functional end groups.

Hyperbranched polymers of the polyester type are described in, e.g., International Publication Number WO 96/12754 and U.S. Pat. No. 6,300,424 B1.

Fluoropolymers are commonly used as polymer processing additives. In some instances, the performance of fluorinated PPAs can be enhanced by incorporating a "synergist." For example, U.S. Pat. No. 6,818,695 B2 ("Extrudable Thermoplastic Compositions," Dillon et al.) describes the use of hyperbranched polyesters and hyperbranched polyesteramides as synergists for use with various fluorinated polymer processing additives. Although synergists are effective at reducing the amount of fluorinated material required, there is a desire to eliminate the use of fluorinated PPAs in some applications.

Hong et al. describe the use of functionalized hyperbranched polyesters as polymer processing additives. (*J. Rheol.* 43 (3) May/June 1999, pp. 781-93.) The hydroxy groups of the hyperbranched polyesters are either reacted with C-14 alkanes to form hexadecanote-terminated polymers or the hydroxy groups are reacted with a mixture of eicosanoic and docosanoic acid such that 50 to 90% of the groups are terminated with C-20/22 alkanes. Hong and Coombs, et al. also describe the use of hyperbranched polyesters functionalized with eicosanoic and docosanoic acids as polymer processing additives. (*Polymer,* 41 (2000), pp. 7705-13.)

The present inventors discovered that, with certain hyperbranched polyester polyols, the hydroxy groups do not need to be functionalized to provide the benefits of a polymer processing additive, e.g., a reduction in melt defects. These benefits could be achieved even in the absence of synergists, which have been used to enhance the performance of other polymer processing additives, or fluorinated materials.

As used herein, a "hyperbranched polyester polyol" refers to a hydroxy-functional, hyperbranched polyester in which at least 90 mole % of the functional end groups are hydroxy groups, e.g., in some cases, at least 95 or even 100 mole % of the functional end groups are hydroxy groups. The term "hyperbranched polyester polyol" distinguishes the hydroxy-functional, hyperbranched polyesters of the present disclosure from functionalized hyperbranched polyesters in which a higher percentage (e.g., 50%, 90% or even 100%) of the hydroxy groups are replaced with, e.g., fatty acid or amine functional groups.

A wide range of hyperbranched polyester polyols are available from Perstorp AB under the trade name BOL-TORN. These materials are described as having a dendritic structure formed by polymerization of a core and 2,2-dimethylol propionic acid.

As shown in the Examples, when combined with a thermoplastic polymer, the hyperbranched polyester polyols of the present disclosure function as polymer processing additives. That is, the hyperbranched polyester polyols reduce the time to clear melt fracture. In some cases, the hyperbranched polyester polyols also reduce the pressure drop of extrusion.

In some cases, the thermoplastic polymers to which the hyperbranched polyester polyols are added comprise polymers obtained by the homopolymerization or copolymerization of olefins. Suitable olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, and butene-1. Representative examples of olefinic polymers include polyethylene, polypropylene, polybutene-1, poly(3-methylbutene), poly(4-methylpentene) and copolymers of ethylene with propylene, butene-1, hexane-1, octene-1, decene-1,4-methyl-1-pentene and octadecene-1.)

In some cases, the thermoplastic polymers are copolymers of one or more olefins and up to about 30 weight percent, but preferably 20 weight percent or less, of one or more monomers which are copolymerizable with such olefins. Representative monomers which are copolymerizable with olefins are vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxy styrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers, N-vinyl carbazole monomers, and N-vinyl pyrrolidone monomers.

In some cases, the thermoplastic polymers also include the metallic salts of olefin copolymers, or blends thereof, which contain free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt.

Representative blends of thermoplastic hydrocarbon polymers useful in this invention are blends of polyethylene and polypropylene, low-density polyethylene and high-density polyethylene, and polyethylene and olefin copolymers containing copolymerizable monomers, some of which are described above, e.g., ethylene and acrylic acid copolymers: ethylene and methyl acrylate copolymers: ethylene and ethyl acrylate copolymers: ethylene and vinyl acetate copolymers: ethylene, acrylic acid, and ethyl acrylate copolymers, and ethylene, acrylic acid, and vinyl acetate copolymers.

The thermoplastic polymers may be used in the form of powders, pellets, granules, or any other extrudable form. In some cases, the thermoplastic polymer may contain other additives such as, e.g., anti-blocking agents, slip agents, light stabilizers, and fillers.

Generally, the amount of the polymer processing additive (i.e., the amount of the hyperbranched polyester polyol polymer processing additive) contained in the thermoplastic composition is not particularly limited. However, for compositions intended for extrusion into finished articles, it may be desirable to minimize the amount of the polymer processing additive, while maintaining the desired processing performance. In some cases, such compositions and articles comprise no greater than 5000 ppm of the polymer processing additive based on the total weight of the composition. For example, in some cases, such compositions or articles comprise 100 to 3000, e.g., 500 to 1500 ppm of the polymer processing additive based on the total weight of the composition.

As it may be difficult to control the amount of the polymer processing additive at such low levels, in some cases, master batches may be used. Such a master batch contains a higher proportion of the polymer processing additive composition in a host resin. The host resin is selected to be compatible with the thermoplastic polymer and may be the same or different than the thermoplastic polymer. The amount of the polymer processing additive in the master batch is not critical. In some cases, the master batches contain 0.2 to 10 wt. %, e.g., 0.5 to 5 wt. % of the 10 polymer processing additive.

Known equipment and methods may be used both to compound the polymer processing additive into the thermoplastic polymer and to process the compounded composition. For example, the polymer processing additives of the present disclosure are useful in the processing of thermoplastic polymers, which includes for example, extrusion of films, extrusion blow molding, injection molding, pipe, wire or cable extrusion, and fiber production.

Examples. The materials used to prepare the polymer processing additive compositions used in the following examples are summarized in Table 1.

TABLE 1

Summary of hyperbranched polyester polyols (HPP) used in the examples.

| Name | Description | Trade Name and Source |
|---|---|---|
| HPP-2A | 2nd Generation hyperbranched polymer of Dimethylol Propionic acid | BOLTORN H20 Perstorp Specialty Chemicals AB, Perstorp, Sweden |
| HPP-2B | 2nd Generation hyperbranched polymer of Dimethylol Propionic acid | Perstorp Specialty Chemicals AB |
| HPP-3A | 3rd Generation hyperbranched polymer of Dimethylol Propionic acid | BOLTORN H30 Perstorp Specialty Chemicals AB |
| HPP-4A | 4th Generation hyperbranched polymer of Dimethylol Propionic acid | Perstorp Specialty Chemicals AB |
| HPP-5A | 5th Generation hyperbranched polymer of Dimethylol Propionic acid | BOLTORN H50 Perstorp Specialty Chemicals AB |
| HPP-5B | 5th Generation hyperbranched polymer of Dimethylol Propionic acid | Perstorp Specialty Chemicals AB |
| HPP-5C | 5th Generation hyperbranched polymer of Dimethylol Propionic acid | BOLTORN H311 Perstorp Specialty Chemicals AB |

Samples of each hyperbranched polyester polyol were dissolved in deuterated dimethyl sulfoxide (DMSO) and nuclear magnetic resonance (NMR) spectra were acquired on a Bruker AVANCE 500 MHz NMR spectrometer equipped with a broadband cryoprobe. 2D NMR spectra were acquired for assignments. Quantitative 13C NMR was acquired using samples dissolved in deuterated DMSO with $GdCl_3$ with an inverse gated pulse sequence. The peaks associated with the alcohol, ester/ether, ester/carboxyl, and quaternary (4°) carbon groups were identified in the $^1H$ and $^{13}C$ NMR. Quantification of linear and dendric branching was performed using the quaternary carbon region of the $^{13}C$ spectra (45-51 ppm).

Figure 1:
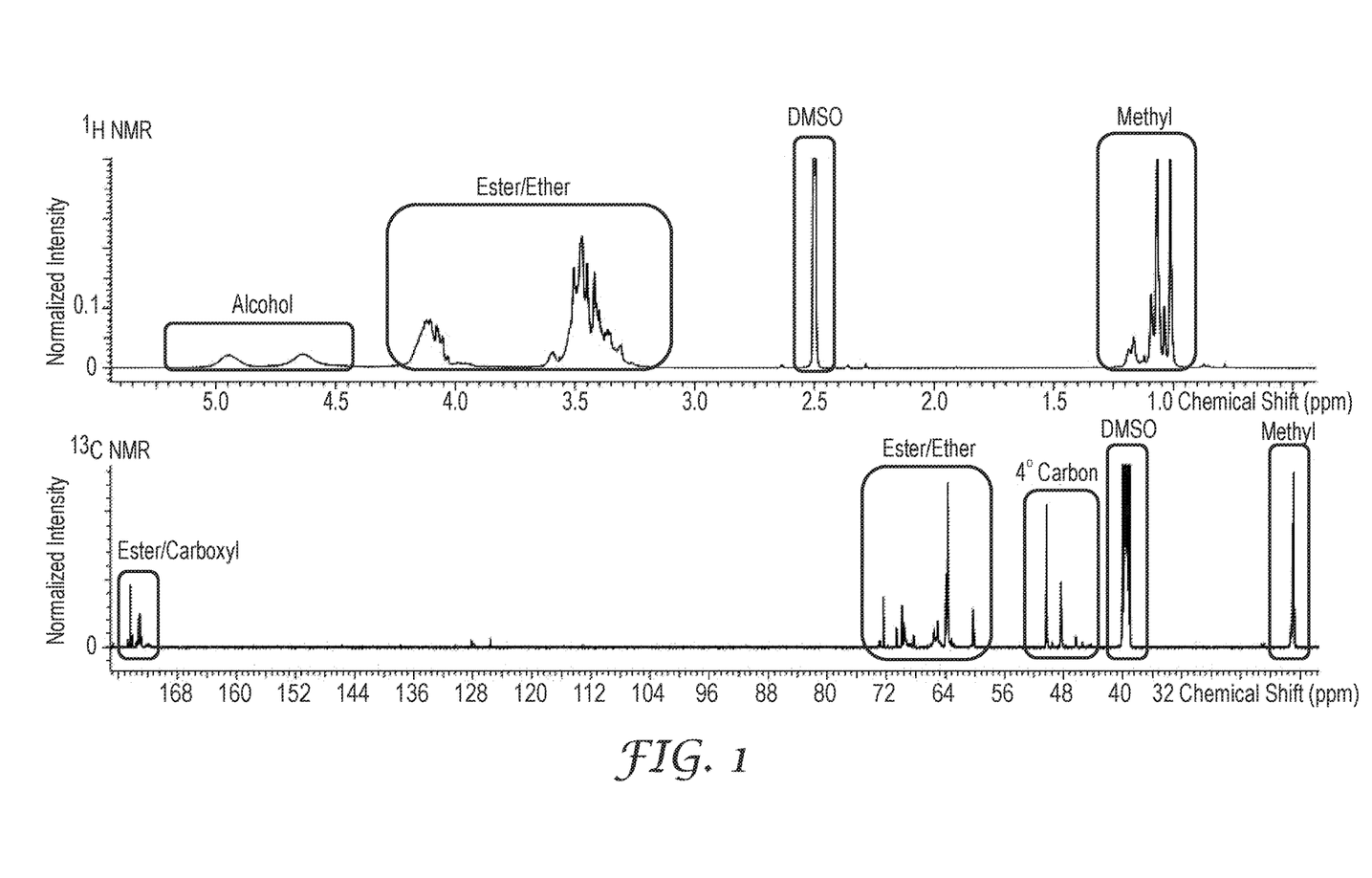
FIG. 1 illustrates the $^1$H and $^{13}$C NMR of a hyperbranched polyester polyol.

The $^1H$ and $^{13}C$ NMR of HPP-2A is shown in FIG. 1. The chemical shift (x-axis) for the peaks in the normalized intensity (y-axis) for alcohol (102), ester/ether (104), DMSO (106) and methyl (108) are shown in the H spectra 100. Similarly, the chemical shift for the peaks in the normalized intensity for ester/carboxyl (210), ester/ether (204), 4° carbon (212), DMSO (206) and methyl (208) are shown in the $^{13}C$ spectra 200.

Figure 2:
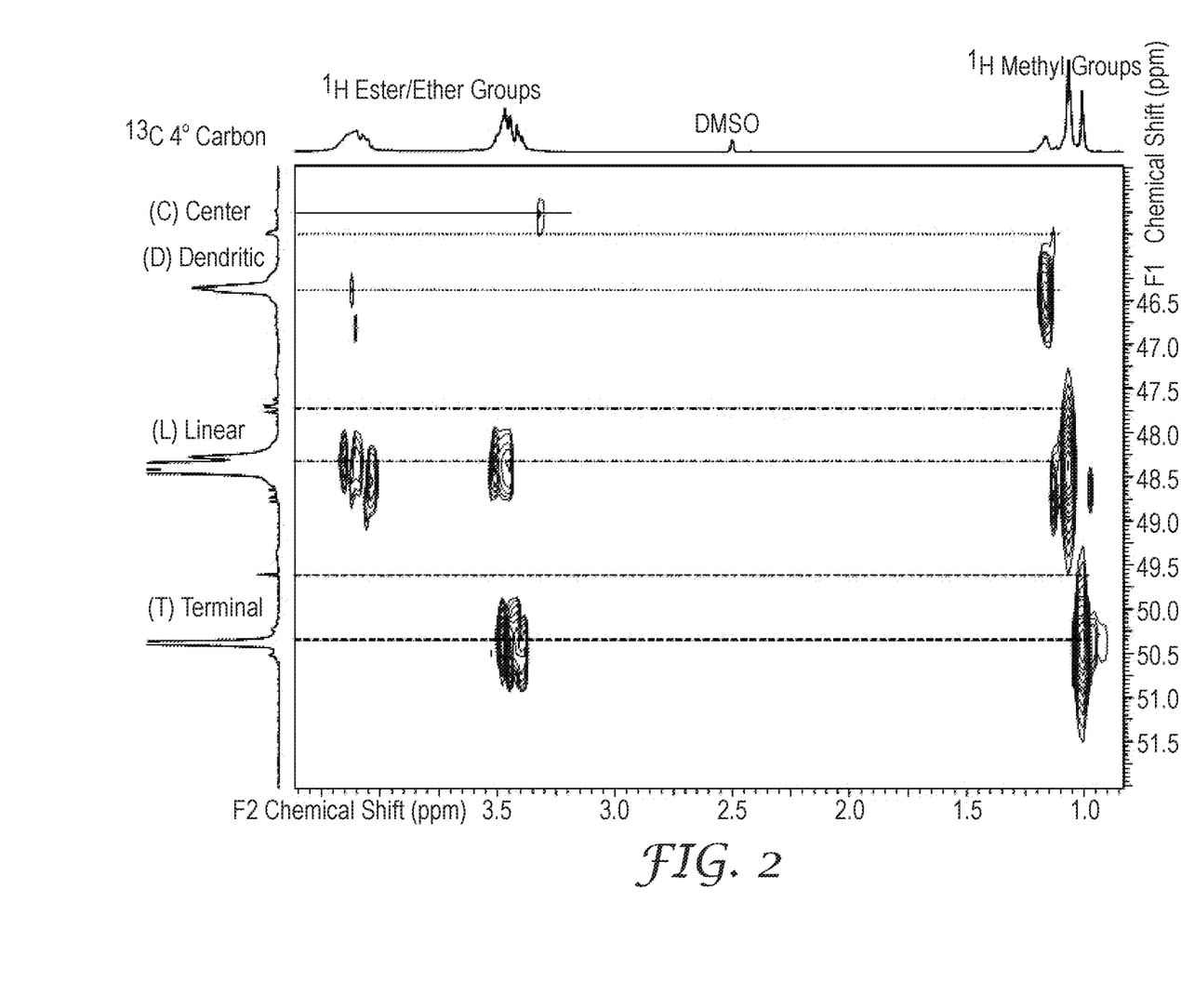
FIG. 2 illustrates the heteronuclear multiple bond correlation plot of a second hyperbranched polyester polyol.

The identities of the quaternary carbon peaks were verified using heteronuclear multiple bond correlation (HMBC). The carbon chemical shift moves approximately 2 ppm for each ester group attached to the quaternary carbon, allowing for resolution between different groups. The HMBC plot for HPP-4A is shown in FIG. 2.

The various quaternary carbons are shown in the illustrative hyperbranched polyester polyol for Formula (I), below.

(I)

The quaternary carbon at the center of the hyperbranched polyester polyol from which the branches extend is identified as "C." The exact nature of links to the C carbon depends on the particular core used. The branches result from the polymerization of 2,2-dimethylol propionic acid, shown as Formula II, below.

(II)

Quaternary carbons with two ester-containing links and one hydroxy-functional group are identified as linear ("L") carbons as the polyester polyol branch extends through these carbon atoms with no additional branching. Quaternary carbons with three ester-containing links and no hydroxy-functional groups are identified as dendritic ("D") carbons as the polyester polyol chain branches into two polyester polyol chains at these carbon atoms creating additional dendritic structure. Finally, quaternary carbons with only one attached ester-containing link and two hydroxy-functional group are identified as terminal ("T") carbons as the polyester polyol branch terminates at these carbon atoms.

The average number of each type of quaternary carbon group per center carbon and the expected molecular weight for the molecule are shown in Table 2.

TABLE 2

Quaternary carbon groups percenter ("C") carbon.

| Sample | Center | Linear | Dendritic | Terminal | MW |
|---|---|---|---|---|---|
| HPP-2A | 1.0 | 9.3 | 1.9 | 5.5 | 2250 |
| HPP-2B | 1.0 | 13.5 | 0.7 | 4.8 | 2519 |
| HPP-3A | 1.0 | 27.3 | 3.2 | 9.1 | 4944 |
| HPP-4A | 1.0 | 32.9 | 8.1 | 13.0 | 6625 |
| HPP-5A | 1.0 | 93.5 | 16.3 | 31.4 | 16857 |
| HPP-5B | 1.0 | 78.7 | 15.3 | 29.5 | 14769 |
| HPP-5C | 1.0 | 111.1 | 62.4 | 31.3 | 24251 |

Sample preparation. Each of the hyperbranched polyester polyols of Table 1 were compounded as a master batch at a level of 2 wt. % in a linear low density polyethylene (LLDPE) resin, along with other components typically used in blown film application. The master batches were prepared in 3 kg batches by shaking vigorously in a bag: 60 g of the ground/powdered hyperbranched polyester polyol, 2935 g of granular resin (2 MI LLDPE, EM 1002.09 available from Exxon Mobil), 3.0 g of a heat stabilizer (IRGANOX B900 from BASF), and 2.1 g of an acid neutralizer (zinc stearate).

Each resulting formulation was fed to a laboratory scale, intermeshing, counter rotating, unvented, air cooled, conical twin screw (HaakeBuchler Rheomix TW-100) with a front inside diameter of 33 mm. The mixture was gravity fed to the throat of the extruder, exposed to air at a rate of 55 g/min. The extruder specific temperature profile of the 3 barrel zones (feed, metering, mixing), and die zone was 170/190/200/200° C. respectively. The extruder was run at 150 RPM for the first "compounding" pass. The 2nd pass was run with the same temperature profile but at 90 RPM while flood feeding the material. A 4 minute "purge" of material was discarded at the beginning each pass, with material collected after the second batch forming the masterbatch used in the steps below.

Melt fracture performance. The melt fracture performance was tested by mixing the desired amount of each master batch into a linear low density polyethylene host resin (0.9 MI ZN LLDPE: MARFLEX 7109 available from Chevron Philips Chemicals). Extrudable material was prepared by diluting the separate masterbatches to a total target level of 1000 ppm of the HPP material in the host resin. The mixture was extruded at 210° C., with a 0.9 mm gap, 14 L/gap die, at 10.5 kg/h, and 220/s, in combination with 6000 ppm of a talc anti-block (ABT 7500 added as a master batch; AMPACET MB #101558) and 1000 ppm of a slip additive (ERUCAMIDE added as a master batch; AMPACET MB #10090).

Trials were conducted using a LABTECH blown film line with a 40 mm, 30/1 extruder. The die was of spiral design with a 40-mm diameter and 0.9-mm die gap. The pressure was recorded every 10 minutes and a sample of film was collected. The film was examined for the presence of melt fracture (MF) and expressed as a percentage of the film area covered with MF. The time corresponding to the disappearance of the last band of MF or time to clear melt fracture was recorded (TTC), at which point the test was stopped. If any MF was remaining at the end of two hours, the test was stopped, and the final MF level recorded.

Figure 3:
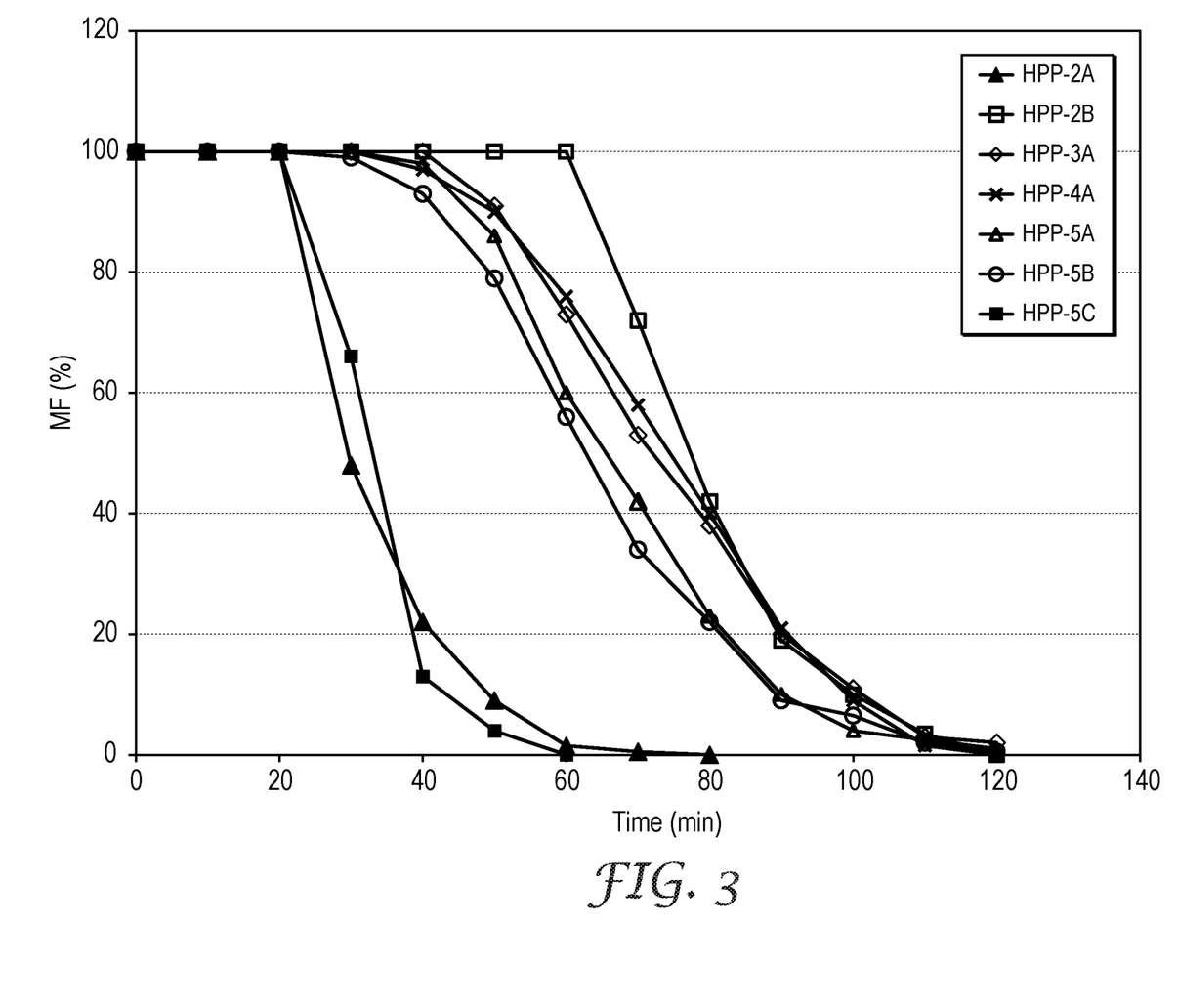
FIG. 3 illustrates the melt fracture elimination achieved with various hyperbranched polyester polyol polymer processing additives.

The results are shown in FIG. 3 and Table 3. As shown, samples HPP-2A and HPP-5C provided significantly better melt fracture elimination than the remaining hyperbranched polyester polyols. HPP-2A cleared melt fracture in 80 minutes and HPP-5C cleared melt fracture in only 60 minutes.

The time to clear melt fracture (TTC) and remaining melt fracture if any, are summarized in Table 4, along with the relative amounts of the linear, dendritic and terminal carbons shown as percents of the total number of linear, dendritic and terminal carbons based on the data in Table 2.

TABLE 4

Melt-fracture data and relative amounts of linear, dendritic and terminal branching.

| Sample | TTC (minutes) | Remaining MF | Linear | Dendritic | Terminal |
|---|---|---|---|---|---|
| HPP-2A | 80 | N/A | 56% | 11% | 33% |
| HPP-2B | 120 | 0 | 71% | 4% | 25% |
| HPP-3A | 120 | 0 | 69% | 8% | 23% |
| HPP-4A | 120 | 1 | 61% | 15% | 24% |
| HPP-5A | 120 | 2 | 66% | 12% | 22% |
| HPP-5B | 120 | 0.5 | 64% | 12% | 24% |
| HPP-5C | 60 | N/A | 54% | 30% | 15% |

As shown, the hyperbranched polyester polyols with less than 60% linear carbons per center carbon correspond to the samples with superior performance in eliminating melt fracture as compared to all samples having greater than 60% linear content. Although all hyperbranched polyester polyols must contain both dendritic and terminal carbons, the relative amounts of the dendritic and terminal carbons do not appear to be critical, as HPP-2A contained 11% dendritic and 33% terminal, while HPP-5C contained 30% dendritic and 15% terminal. Thus, hyperbranched polyester polyol containing less than 60% linear carbons, e.g., hyperbranched polyester polyols with 40 to 60%, e.g., 45 to 60%, 50 to 60%, e.g., 52 to 58%, or even 53 to 57% linear carbons, based on the total number of linear, dendritic and terminal carbons, are highly effective as polymer processing additives.

The performance of polymer processing additives can be improved by the addition of a synergist to form a polymer processing additive composition. In some cases, the synergists further reduce the time to melt fracture. In some cases, the synergists further reduce the pressure drop of extrusion. In some cases, the synergists can be used to reduce the amount of the hyperbranched polyester polyol polymer processing additive while maintaining the same or similar performance.

Suitable synergists include polyethylene glycol, poly(ethylene oxide) and polycaprolactone. In some cases, the polyethylene glycols have a number average molecular

TABLE 3

Elimination of melt fracture.

| Minutes | HPP-2A | HPP-2B | HPP-3A | HPP-4A | HPP-5A | HPP-5B | HPP-5C |
|---|---|---|---|---|---|---|---|
| 0 | 100 | 100 | 100 | 100 | 100 | 100 | 100 |
| 10 | 100 | 100 | 100 | 100 | 100 | 100 | 100 |
| 20 | 100 | 100 | 100 | 100 | 100 | 100 | 100 |
| 30 | 48 | 100 | 100 | 100 | 100 | 99 | 66 |
| 40 | 22 | 97 | 100 | 98 | 100 | 93 | 13 |
| 50 | 9 | 90 | 100 | 86 | 91 | 79 | 4 |
| 60 | 1.5 | 76 | 100 | 60 | 73 | 56 | 0 |
| 70 | 0.5 | 58 | 72 | 42 | 53 | 34 | |
| 80 | 0 | 40 | 49 | 23 | 38 | 22 | |
| 90 | | 21 | 19 | 10 | 20 | 9 | |
| 100 | | 9 | 10 | 4 | 11 | 6.5 | |
| 110 | | 1.5 | 3.5 | 2.5 | 3 | 2 | |
| 120 | | 0 | 0 | 1 | 2 | 0.5 | | weight of 1000 to 50,000 Daltons, e.g., 4000 to 25,000 Daltons. In some cases, the poly(ethylene oxide)s have a number average molecular weight of 10,000 to 500,000 Daltons, e.g., 15,000 to 400,000 Daltons. In some cases, the polycaprolactones have a number average molecular weight of 2,000 to 200,000 Daltons, e.g., 50,000 to 150,000 Daltons. The number average molecular weight may be measured by Gel Permeation Chromatography (GPC) using polyethylene glycol and poly(ethylene oxide) standards. GPC equipment and standards are available from Agilent Technologies, Inc.

Generally, the weight ratio of the polymer processing additive to the synergist in the polymer processing additive composition is from 90:10 to 10:90. In some cases, the weight ratio is 75:25 to 25:75, or even 60:40 to 40:60.

Generally, the amount of the polymer processing additive composition (i.e., the combined amount of the hyperbranched polyester polyol polymer processing additive and the synergist) contained in the thermoplastic composition is not particularly limited. However, for composition intended for extrusion into finished articles and int finished article, it may be desirable to minimize the amount of the polymer processing additive composition, while maintaining the desired processing performance. In some cases, such compositions ad articles comprise no greater than 5000 ppm of the polymer processing additive composition based on the total weight of the composition. For example, in some cases, such compositions or articles comprise 100 to 3000, e.g., 500 to 1500 ppm of the polymer processing additive composition based on the total weight of the composition.

In some cases, each component of the polymer processing additive composition may be added separately to the thermoplastic polymer. In some cases, the hyperbranched polyester polyol polymer processing additive and the synergist may be blended, e.g., in the desired ratio, and then added together to the thermoplastic polymer. For example, the components of the polymer processing additive composition may be blended by physical mixing or melt-blending. In such cases, additional amounts of the hyperbranched polyester polyol polymer processing additive or the synergist may be added to the thermoplastic polymer to adjust their amounts.

As it may be difficult to control the amount of the polymer processing additive composition at such low levels, in some cases, master batches may be used. Such a master batch contains a higher proportion of one or more of the components of the polymer processing additive composition in a host resin. The host resin is elected to be compatible with the thermoplastic polymer and may be the same or different than the thermoplastic polymer.

In some cases, separate master batches may be used with one containing the hyperbranched polyester polyol polymer processing additive and one containing the synergist. This may be useful when, e.g., it may be desirable to adjust the ratio of the hyperbranched polyester polyol polymer processing additive and the synergist. Again, the amount of the specific component in the master batch is not critical. In some cases, the master batches contain 0.2 to 10 wt. %, e.g., 0.5 to 5 wt. % of those components of the polymer processing additive composition present in the master batch. In some cases, a single combined masterbatch containing both the hyperbranched polyester polyol polymer processing additive and the synergist.

A master batch of HPP-5C (55% linear) was prepared at a level of 3 wt. %. The master batch was prepared in a 2 kg batch by shaking vigorously in a bag: 60 g of the ground/powdered hyperbranched polyester polyol, 1940 g of granular resin (2 MI LLDPE, EM 1002.09 available from Exxon Mobil), 2.0 g of a heat stabilizer (IRGANOX B900 from BASF), and 1.4 g of an acid neutralizer (zinc stearate).

In a similar manner, a master batch of a polyethylene glycol synergist. Specifically, a 2 kg patch was prepared by shaking vigorously in a bag: 60 g of polyethylene glycol (8000 MW from Dow Chemical Company), 1940 g of granular resin (2 MI LLDPE, EM 1002.09 available from Exxon Mobil), 2.0 g of a heat stabilizer (IRGANOX B900 from BASF), and 1.4 g of an acid neutralizer (zinc stearate).

Each resulting formulation was fed to a laboratory scale, intermeshing, counter rotating, unvented, air cooled, conical twin screw (HaakeBuchler Rheomix TW-100) with a front inside diameter of 33 mm. The mixture was gravity fed to the throat of the extruder, exposed to air at a rate of 55 g/min. The extruder specific temperature profile of the 3 barrel zones (feed, metering, mixing), and die zone was 170/190/200/200° C. respectively. The extruder was run at 150 RPM for the first "compounding" pass. The 2nd pass was run with the same temperature profile but at 90 RPM while flood feeding the material. A 4 minute "purge" of material was discarded at the beginning each pass, with material collected after the second batch forming the masterbatch used in the steps below.

Melt fracture performance. The melt fracture performance was tested by mixing the desired amount of each master batch into a linear low density polyethylene host resin (0.9 MI ZN LLDPE: MARFLEX 7109 available from Chevron Philips Chemicals). Extrudable material was prepared by diluting the separate masterbatches to a total target level of 500 or 1000 ppm of the HPP material and 0 or 500 ppm of the synergist in the host resin as listed in Table 5. The mixture was extruded at 210° C., with a 0.9 mm gap, 14 L/gap die, at 10.5 kg/h, and 220/s, in combination with 6000 ppm of a talc anti-block (an ABT 7500 master batch: AMPACET MB #101558) and 1000 ppm of a slip additive (a ERUCAMIDE master batch; AMPACET MB #10090).

Trials were conducted using a LABTECH blown film line with a 40 mm, 30/1 extruder. The die was of spiral design with a 40-mm diameter and 0.9-mm die gap. The pressure was recorded every 10 minutes and a sample of film was collected. The film was examined for the presence of melt fracture (MF) and expressed as a percentage of the film area covered with MF. The time corresponding to the disappearance of the last band of MF or time to clear melt fracture was recorded (TTC), at which point the test was stopped. If any MF was remaining at the end of two hours, the test was stopped, and the final MF level recorded. The compositions of the samples are shown in Table 5, where all amounts are reported as ppm by weight based on the total weight of the extruded composition. The results are summarized in Table 6.

TABLE 5

Compositions with a hyperbranched polyester polyol PPA with a PEG synergist.

| Sample | PPA | PPA (ppm) | PEG (ppm) |
| --- | --- | --- | --- |
| A | HPP-5C | 500 | 0 |
| B | HPP-5C | 500 | 500 |
| C | HPP-5C | 1000 | 0 |

TABLE 6

Melt fracture data for hyperbranched polyester polyols PPA with a PEG synergist

| Time (minutes) | A | B | C |
|---|---|---|---|
| 0 | 100 | 100 | 100 |
| 10 | 100 | 100 | 100 |
| 20 | 90 | 98 | 85 |
| 30 | 55 | 75 | 40 |
| 40 | 25 | 45 | 10 |
| 50 | 8 | 20 | 1.5 |
| 60 | 5 | 10 | 0 |
| 70 | 2 | 3 | |
| 80 | 1 | 1 | |
| 90 | 0.5 | 0.5 | |
| 100 | 0.5 | 0 | |
| 110 | 0.1 | | |

As shown, the addition of 500 ppm of the PEG synergist improved the melt fracture elimination as compared to 500 ppm of the hyperbranched polyester polyol alone. In addition, the melt fracture elimination was satisfactory, while reducing the required amount of the hyperbranched polyester polyol by 50% compared to the samples containing 1000 ppm of the hyperbranched polyester polyol.

What is claimed is:

1. A composition comprising greater than 50% by weight of a thermoplastic polyolefin polymer and a polymer processing additive comprising a hyperbranched polyester polyol having 40 to 60% linear carbons, based on the total number of linear, dendritic, and terminal carbons; wherein the hyperbranched polyester polyol is a hydroxy-functional, hyperbranched polyester having functional end groups, in which at least 90 mole % of the functional end groups are hydroxy groups; wherein the composition comprises 100 to 3000 ppm by weight of the polymer processing additive based on the weight of the thermoplastic polyolefin polymer and wherein the composition further comprises a synergist selected from the group consisting of polyethylene glycols, poly (ethylene oxide) s, polycaprolactones and combinations thereof, wherein the weight ratio of the hyperbranched polyester polyol to the synergist is from 25:75 to 75:25.

2. The composition of claim 1, wherein the hyperbranched polyester polyol has from 50% to 60% linear carbons, based on the total number of linear, dendritic, and terminal carbons.

3. The composition of claim 2, wherein the hyperbranched polyester polyol has from 52% to 58% linear carbons, based on the total number of linear, dendritic, and terminal carbons.

4. The composition of claim 1, wherein the thermoplastic polyolefin polymer comprises a linear low density polyethylene.

5. The composition according to claim 1, wherein branches of the hyperbranched polyester polyol comprised polymerized units of 2,2-dimethylol propionic acid.

6. The composition of claim 1, wherein the synergist comprises polyethylene glycol.

* * * * *